Feb. 5, 1935.  D. W. McNEIL  1,990,194
METERING FAUCET
Filed June 28, 1932
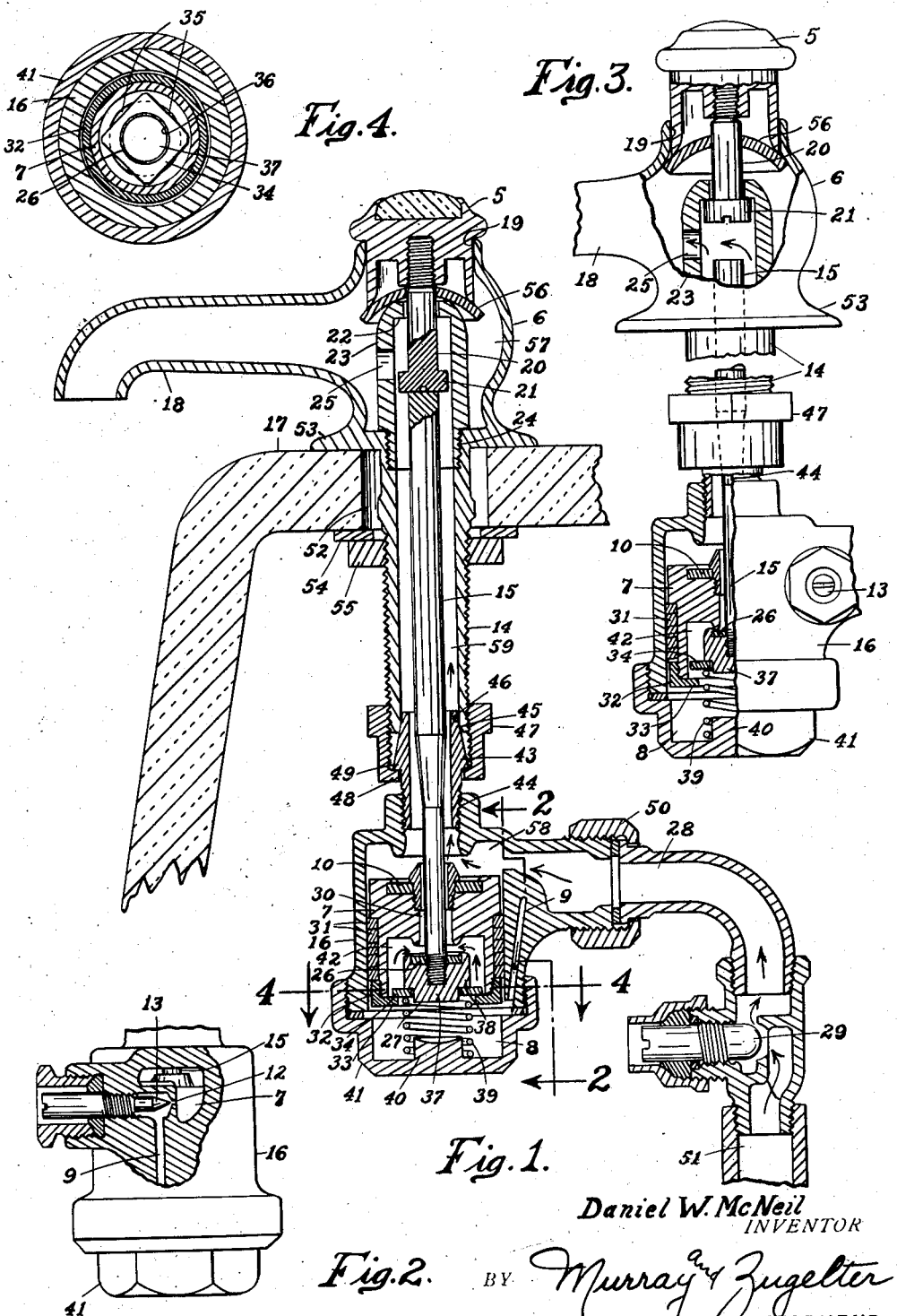
Daniel W. McNeil
INVENTOR
BY Murray and Zugelter
ATTORNEYS Patented Feb. 5, 1935

1,990,194

UNITED STATES PATENT OFFICE 1,990,194

METERING FAUCET

Daniel W. McNeil, Cincinnati, Ohio, assignor to The John Douglas Company, Cincinnati, Ohio, a corporation of Ohio Application June 28, 1932, Serial No. 619,721

13 Claims. (Cl. 277—44)

This invention relates to improvements in self-closing metering faucets. One major improvement is the production of a metering faucet the construction of which is such that a metering plunger of large area, and also a comparatively large non-clogging orifice for feeding water thereto, may be employed without necessitating an undesirable increase in size of the exposed portion of the faucet which extends above the slab of a sink bowl.

Other objects of the invention are to provide a metering faucet of a pleasing slender appearance, in which certain vital parts are made large, as they should be, to insure reliability of operation and proper durability; to render vandal-proof and fool-proof a faucet of the self-closing metering type; to provide a simplified construction of self-closing metering valve wherein very small and easily clogged water orifices are eliminated without sacrificing accuracy or nicety of adjustment; to provide for replacement of parts, if necessary, without disturbing the valve body as all working parts are beneath the slab which supports the valve body.

The foregoing and other objects are attained by the means described herein and disclosed in the accompanying drawing, in which:

Fig. 1 is a longitudinal cross-sectional view of the faucet of the invention, showing the actuating button depressed to open the valve.

Fig. 2 is a fragmentary cross-sectional view taken on line 2—2 of Fig. 1.

Fig. 3 is a view somewhat similar to Fig. 1, showing the valve open but with the actuating button restored to the normal position by the pressure of water.

Fig. 4 is a cross-sectional view taken on line 4—4 of Fig. 1.

The device of this invention is a faucet for sink bowl or similar use, wherein depression of an actuating means which may be a lever or a button 5, effects a limited flow of water or other liquid for a limited time after release of the actuating means. This general type of valve is old and well known, but up to the present time such faucet valves have been open to various objections. For example, it was customary heretofore to have most of the fluid controlling mechanism located within the faucet body 6, in which case the diameter of the fluid shut-off plunger 7 was limited to the interior dimensions of the faucet body 6. As a result of such construction, the faucet body had to be made large and cumbersome with a design not particularly pleasing in appearance, or else the plunger 7 had to be made of such small diameter that it presented but a small area to the water in the lower chamber 8. Due to said small area of plunger 7, it required only a small leakage through the pressure leak passage 9 to elevate the plunger 7 for closing the main valve 10, and in order to effect a slow elevating movement of the plunger it was necessary to provide a very small pressure leak orifice 12 at the pressure leak needle valve 13. By thus cutting down the size of the orifice 12 to such a fine degree, the least amount of corrosion or the least accumulation of dirt or the like disturbed the adjustment and interfered with proper function of the valve. I have overcome this objectionable feature by so constructing the device that a plunger of comparatively large area may be used, so that the flow of water past the needle valve 13 may be faster than in previous valves, while the elevating speed of the plunger is no greater than the elevating speed of plungers in the older type of metering valve. In other words, to effect a given elevating speed of the plunger 7, the orifice 12 of the pressure leak valve may be kept larger, and therefore more free of constriction, than in the prior devices.

I accomplish the aforesaid improvements by making the faucet body 6 and its shank 14 large enough only to accommodate the actuating mechanism 5 and a reciprocable valve stem 15, placing the entire fluid controlling apparatus in a separate valve housing 16 that is attached removably to the lower or free end of the faucet shank. In this way I am enabled to dispose of working parts of the device behind or beneath the faucet supporting slab 17 on which the device is mounted, thereby rendering the valve fool-proof and protected from vandalism on the part of persons inclined to tamper therewith. This feature, however, is secondary to the idea of providing a small and neat faucet body 6 that is exposed to view exteriorly or atop the slab 17.

The body 6 of the faucet preferably is provided with some sort of spout 18 extending laterally thereof, the top of the body being provided with an opening 19 for reception of the push button 5 or other suitable actuating means. It is to be noted that the push button is precluded from easy removal by the provision of a screw 20 that threadedly engages the push button, the head 21 of the screw being adapted to engage a shoulder 22 directed inwardly of a screw guide 23 that is threaded or otherwise secured within the faucet body by any suitable means such as screw threads 24. The screw head 21 has a sliding fit within the hollow screw guide 23, so that the head may move from the position indicated in Fig. 3 to a position such as is indicated in Fig. 1 and then back to the first position. The hollow guide is provided with a suitable aperture 25 for discharge of water into the spout 18.

The screw head 21 is adapted to strike and move the upright valve stem 15 for effecting unseating of the relief valve 26 and the main valve 10. The relief valve element 26 is fixed to the lower end 27 of the valve stem by any suitable means such as screw threads or the like, so that upon depression of the actuating button 5 and downward movement of the valve stem, the relief valve 26 will open for relieving the pressure of water in the lower relief or retarding chamber 8. It will be understood, of course, that the chamber 8 always is supplied with water under pressure by means of the pressure leak passage 9 and needle valve 13 and orifice 12, which are constantly in fluid communication with the fluid under pressure contained within the main supply line 28. The metal to metal contact adjusting valve 29 merely determines the flow of fluid which may be discharged through the spout 18.

The plunger 7 is provided with a central bore 30 of ample size so that the plunger may move freely longitudinally of the valve stem while at the same time, water is permitted to flow through the bore and past the valve stem when the plunger is moved downwardly into the water filled chamber 8. It will be observed that the plunger is provided with suitable packing material 31 which is held in place by a packing nut or ring 32 that has an inwardly directed annular flange 33. The flange 33 provides an abutment for a thrust plate or bearing plate 34 which functions as a means for moving the main plunger 7 downwardly when the valve stem 15 is depressed. From Fig. 4 it will readily be observed that the thrust or bearing plate 34 is made in such a shape that suitable apertures or passages 35 are provided through which the relief chamber 8 may be exhausted of water as the plunger is moved downwardly by manual force applied to actuating button 5. In the form illustrated by the drawing, the thrust or bearing plate 34 is made square in shape.

The plate 34 is provided with a central opening 36 for reception of a boss 37 formed on the bottom face of the relief valve member 26, and said plate is maintained in abutment upon a shoulder 38 of the valve member by means of a suitable spiral compression spring or other yieldable means 39. The spring may be maintained in a central position by means of an inwardly extending boss 40 carried by the screw cap 41 that forms part of the chamber 8. It should be noted that the lower part of chamber 8 is in constant communication with the upper part 42 thereof through the openings 35 provided by the bearing plate.

A swivel joint is effected between the shank 14 of the faucet body and the casing 16 of the valve mechanism, by means of a short section of tubing 43 that is screw-threaded into the valve casing as at 44. The upper end of the member 43 is made conical in shape, as indicated at 45, in order that it may be received in a tapered portion 46 of the shank interior to provide a tight swivel or rotating connection. The connection is maintained by means of a nut 47 that is threadedly engaged with the lower end of the opposite shank 14, said nut being provided with an inwardly extending annular flange 48 which engages a shoulder 49 of the tubular member 43. By means of the above described swivel connection and the second swivel connection indicated at 50, the valve is rendered capable of great flexibility in application to any given relationship of slab and main water supply 51.

The device is applied to the slab 17 by inserting the shank 14 through a suitable opening 52 in the slab, the slab being clamped between the faucet body flange 53 and a washer 54 by means of a nut 55 that engages the screw threads of the shank 14. With the exception of the actuating means and a short length of the valve stem, all working parts and adjustments are disposed below or behind the slab 17, so that unauthorized tampering with the mechanism is rendered difficult, while at the same time the faucet body 6 may be made small and neat in appearance. In prior devices of the general type to which this invention relates, the faucet body 6 extended over twice as far above the slab 17 as does the housing 6 of the improved valve illustrated and described herein. It is to be noted further that the actuating means or button 5 is so mounted that it cannot be removed by unscrewing or even by the application of force.

Between the button 5 and the screw guide 23 is disposed a suitable flexible washer 56 of rubber or other suitable material which functions to absorb the shock and prevent noise in the event that the button 5 is depressed by the application of a sharp blow thereon. As is clearly indicated in Fig. 3, the washer also seals the space between the annular skirt of the button and the housing 6 when the button is disposed in the elevated position with the water flowing from the opening 25 into the spout 18. It is to be observed that the area of the opening 25 is less than that of the cross sectional area of the spout interior, so that when water under pressure is issuing from the opening 25, a vacuum is created within the interior 57 of the housing 6. By means of the construction just described, all tendency of a fluid to leak out around the actuating button is effectually precluded.

The operation of the device is as follows. To effect a flow of water through the faucet, the actuating member 5 is depressed, thereby causing the head 21 of the screw 20 to strike and move downwardly the stem 15 which extends into the valve casing 16. The downward movement of the valve stem first opens the relief valve 26 to relieve the pressure within the chamber 8—42. As the stem is moved further, the thrust plate 34 is advanced, against the resistance of spring 39, until it strikes the shoulder 33 and moves the large plunger 7 downwardly for displacing the water in chamber 8—42. The downward movement of the large plunger 7 effects opening of the main valve 10 as is obvious. Water may thereupon flow from supply pipe 51, through the passages 28, 58, 59 and 25, whence it is projected through the spout of the faucet. When the actuating means 5 is released, the water pressure acting upon the head 21 of the screw 20, elevates the button 5 to the normal position shown in Fig. 3, so that there may be a free flow of water through the opening 25 and into the spout. While the water is being thus delivered, the chamber 8 is slowly filling up, due to passage of water through the orifice 12, thereby slowly elevating the plunger 7 toward the closed valve position. It will be understood, of course, that while the chamber 8 is filling, the spring 39 is holding the relief valve 26 in a closed position. After a measured amount of water, determined by the size of the orifice 12, has been delivered through the spout 18, the valve thus automatically closes and remains closed until the actuating member or button 5 is again depressed.

It is to be observed that the head of screw 20 almost completely closes the opening 25 against delivery of water when the button 5 is depressed and held in such a depressed position. The advantage of this relationship between the screw head and the opening 25 is to discourage the placing of a weight or other means upon the button 5 to secure continuous delivery of water. If it were possible to apply a weight to the button, careless persons would many times permit the weight to remain thereon and thus bring about a great waste of water, but by constructing the actuating mechanism in the manner disclosed herein, no satisfactory performance can be gained by maintaining the actuating button in a fully depressed condition.

The herein described improvements have obviated many of the faults common to metering valves of the self-closing type, rendering them capable of more general usage in a satisfactory manner, since by means of said improvements the devices hold their adjustment much longer and wear on the plunger is reduced due to its large diameter. Furthermore, there are no exposed parts or adjustments to be tampered with or abused, since all such parts are disposed beneath or behind the sink slab. The mechanical construction of the device is such that the exposed parts of the faucet body contain no large working parts, hence the faucet body may be designed to meet the demand for neat and delicate appearing fixtures.

It is to be understood that various modifications and changes in structural details may be made, within the scope of the claims, without departing from the spirit of the invention.

What is claimed is:

1. A faucet comprising in combination, a faucet body having a discharge spout, and a mounting flange on the body, a body shank extending from the faucet body beyond the flange, said shank having a free end, a fluid controlling valve located at the free end of the shank exteriorly of both the shank and the body, and having a discharge port in communication with the body shank valve actuating means adjacent to the other end of the shank and supported by the faucet body, and a valve stem extending through the full length of the shank, into the discharge port of the valve and arranged to cooperate with the actuating means and the fluid controlling valve, said fluid controlling valve comprising a casing having a plunger chamber, and a valve plunger reciprocable in the casing and fitting snugly within the plunger chamber, the plunger being larger in diameter than the shank of the faucet body, and means cooperating with the valve actuating means at a location exteriorly of and remote from the valve plunger casing, for reducing the flow of fluid through the discharge spout upon an attempt to forcibly hold the actuating means in a fully depressed condition.

2. A faucet comprising in combination, a faucet body having a discharge spout and a mounting flange on the body, a body shank extending from the faucet body beyond the flange, said shank having a free end, a valve actuating means supported upon the faucet body, a fluid controlling valve comprising a casing and means for attaching the casing to the free end of the shank, said valve having a discharge port in communication with the hollow body shank, a plunger fitted closely within the casing and adapted for reciprocating movement therein, cooperative main valve seats supported by the plunger and the casing, a relief valve member and cooperative relief valve seats on said member and the plunger, the casing providing a retarding chamber which may be relieved of water pressure through the relief valve, a pressure leak passage leading to the retarding chamber and having fluid communication with a source of fluid under pressure, a valve for controlling flow of fluid through the leak passage, a stem extending through the shank and the discharge port of the fluid controlling valve and arranged to respond to movement of the actuating means for unseating the main valve and the relief valve, means for yieldingly urging the relief valve toward its seat, the main valve and the relief valve being disposed wholly below the flange of the body, and the plunger being larger in diameter than the shank of the faucet body so as to provide an exceptionally large area upon which the fluid from the pressure leak passage may act for gradually closing the main valve, and means cooperating with the valve actuating means at a location exteriorly of and remote from the valve plunger casing, for reducing the flow of fluid through the discharge spout upon an attempt to forcibly hold the actuating means in a fully depressed condition.

3. A faucet comprising in combination, a faucet body having a top opening and a spout, a mounting flange adjacent to the spout, a hollow shank extending from the flange in axial alignment with the opening of the faucet body, an inverted cup-shaped valve actuating button having a skirt portion extending partly into the opening of the faucet body, a headed member anchored in the button with the head thereof spaced from the button interior, a guide secured interiorly of the body, said guide having an abutment at an end thereof against which the head of the headed member may abut for limiting movement of the button outwardly of the faucet body, and a stem extending through the shank and the guide for movement upon reciprocation of the button.

4. A faucet comprising in combination, a faucet body having a top opening and a spout, a mounting flange adjacent to the spout, a hollow shank extending from the flange in axial alignment with the opening of the faucet body, an inverted cup-shaped valve actuating button having a skirt portion extending partly into the opening of the faucet body, a headed member anchored in the button with the head thereof spaced from the button interior, a guide secured interiorly of the body, said guide having an abutment at an end thereof against which the head of the headed member may abut for limiting movement of the button outwardly of the faucet body, a stem extending through the shank and the guide for movement upon reciprocation of the button, and a discharge port in the guide of the headed member, said port being of less carrying capacity than the spout, and directed toward the spout, so as to effect creation of a vacuum in the faucet body when liquid is forced through the port and out of the spout.

5. A self-closing faucet comprising in combination, a faucet body having a discharge port, a valve and means acting constantly to close the valve, a depressible actuating means for opening the valve, and means cooperating with the valve actuating means at a location exteriorly of and remote from the valve, for reducing the flow of fluid through the discharge port upon an attempt to forcibly hold the actuating means in a fully depressed condition.

6. A self-closing faucet comprising in combination, a faucet body having a discharge spout, and a mounting flange on the body, a body shank extending from the faucet body beyond the flange, said shank having a free end, a fluid controlling valve located at the free end of the shank exteriorly of both the shank and the body, yieldingly depressible valve actuating means adjacent to the other end of the shank and supported by the faucet body, a valve stem extending through the full length of the shank and arranged to cooperate with the actuating means of the fluid controlling valve, and means including an inverted headed stud on the yieldingly depressible actuating means, said stud being located adjacent to the discharge spout of the faucet and exteriorly of the valve, for reducing flow of fluid through the discharge spout when the actuating means is forceably held in a fully depressed condition.

7. A self-closing faucet comprising in combination, a faucet body having a discharge spout and a mounting flange on the body, a body shank extending from the faucet body beyond the flange, said shank having a free end, a yieldingly depressible valve actuating means supported upon the faucet body, a fluid controlling valve comprising a casing and means for attaching the casing to the free end of the shank, a plunger fitted closely within the casing and adapted for reciprocating movement therein, cooperative main valve seats supported by the plunger and the casing, a relief valve member and cooperative relief valve seats on said member and the plunger, the casing providing a retarding chamber which may be relieved of water pressure through the relief valve, a pressure leak passage leading to the retarding chamber and having fluid communication with a source of fluid under pressure, a stem extending through the shank and arranged to respond to movement of the actuating means for unseating the main valve and the relief valve, means for yieldingly urging the relief valve toward its seat, and means cooperating with the valve actuating means within the faucet body and exteriorly of the main valve, for reducing the flow of fluid through the spout in the event that the actuating means is forcibly held in a fully depressed condition to prevent self-closing of the valves.

8. A faucet comprising in combination, a faucet body having a discharge spout, and a mounting flange on the body, a body shank extending from the faucet body beyond the flange, said shank having a free end, a fluid controlling valve located at the free end of the shank exteriorly of both the shank and the body, and having a discharge port in communication with the body shank, a vertical valve stem extending through the full length of the shank and into the discharge port of the valve, a valve actuating element disposed atop and extending into the body in substantial alignment with the valve stem, means located above the upper end of the valve stem and accessible only from the body interior, for maintaining the actuating element in the aforesaid position relative to the faucet and the valve stem, and means associating the lower end of the valve stem with the fluid controlling valve, for actuation of said valve by the valve stem, said fluid controlling valve comprising a casing and a valve plunger reciprocable in the casing, the plunger being larger in diameter than the shank of the faucet body.

9. A faucet comprising in combination, a faucet body having a discharge spout, and a mounting flange on the body, a body shank extending from the faucet body beyond the flange, said shank having a free end, a fluid controlling valve located at the free end of the shank exteriorly of both the shank and the body, and having a discharge port in communication with the body shank, a vertical valve stem extending through the full length of the shank and into the discharge port of the valve, a valve actuating element disposed atop and extending into the body in substantial alignment with the valve stem, means located above the upper end of the valve stem and accessible only from the body interior, for maintaining the actuating element in the aforesaid position relative to the faucet and the valve stem, and means associating the lower end of the valve stem with the fluid controlling valve, for actuation of said valve by the valve stem.

10. A faucet comprising in combination, a faucet body having a discharge spout, and a mounting flange on the body, a body shank extending from the faucet body beyond the flange, said shank having a free end, a fluid controlling valve located at the free end of the shank exteriorly of both the shank and the body, and having a discharge port in communication with the body shank, a vertical valve stem extending through the full length of the shank and into the discharge port of the valve, a valve actuating element disposed atop and extending into the faucet body substantially in alignment with the valve stem, an apertured guide fixed within the body above the stem and beneath the actuating element, and a normally inaccessible headed stud depending from the actuating element interiorly of the faucet body and extending through one aperture of the guide so as to limit upward movement of the actuating element, the head of the stud being in position to contact the upper end of the vertical stem, and means associating the lower end of the valve stem with the fluid controlling valve, for actuation of said valve by the valve stem.

11. A faucet comprising in combination, a faucet body having a discharge spout, and a mounting flange on the body, a body shank extending from the faucet body beyond the flange, said shank having a free end, a fluid controlling valve located at the free end of the shank exteriorly of both the shank and the body, and having a discharge port in communication with the body shank, a vertical valve stem extending through the full length of the shank and into the discharge port of the valve, a valve actuating element disposed atop and extending into the faucet body substantially in alignment with the valve stem, an apertured guide fixed within the body above the stem and beneath the actuating element, and a normally inaccessible headed stud depending from the actuating element interiorly of the faucet body and extending through one aperture of the guide so as to limit upward movement of the actuating element, the head of the stud being in position to contact the upper end of the vertical stem, and means associating the lower end of the valve stem with the fluid controlling valve, for actuation of said valve by the valve stem, said fluid controlling valve comprising a casing and a valve plunger reciprocable in the casing, the plunger being larger in diameter than the shank of the faucet body.

12. A faucet comprising in combination, a faucet body having a discharge spout, and a mounting flange on the body, a body shank extending from the faucet body beyond the flange, said shank having a free end, a fluid controlling valve located at the free end of the shank exteriorly of both the shank and the body, and having a discharge port in communication with the body shank, a vertical valve stem extending through the full length of the shank and into the discharge port of the valve, a valve actuating element disposed atop and extending into the faucet body substantially in alignment with the valve stem, an apertured guide fixed within the body above the stem and beneath the actuating element, and a normally inaccessible headed stud depending from the actuating element interiorly of the faucet body and extending through one aperture of the guide so as to limit upward movement of the actuating element, the head of the stud being in position to contact the upper end of the vertical stem, and also to move into position for impeding flow of fluid through a second aperture of the guide when the actuating member is substantially fully depressed, and means associating the lower end of the valve stem with the fluid controlling valve, for actuation of said valve by the valve stem.

13. A faucet comprising in combination, an apertured faucet body having a discharge spout, and a mounting flange on the body, a hollow body shank extending vertically from the faucet body beyond the flange, axially of the faucet body aperture, said shank having a free open end, a fluid controlling valve located at said free end of the shank exteriorly of both the shank and the body, said valve having a discharge port in communication with the vertically disposed shank, a valve actuating element extending through the aperture of the faucet body axially of the shank, a valve stem extending through the full length of the shank into the vertically disposed discharge port of the valve, a fixed apertured guide intermediate the stem and the actuating element, a headed stud extending through the aperture of the guide and secured to an inner part of the actuating element, with the head thereof below the guide and resting normally upon the upper end of the valve stem, a plunger chamber formed within the fluid controlling valve, said chamber being considerably larger in diameter than the faucet body shank, a valve plunger snugly fitting but reciprocable within the enlarged plunger chamber, a connection between the plunger and the faucet stem, and a pressure leak means disposed for conveying line pressure to one face of the plunger for urging the valve always to the closed position, said pressure leak means being rendered substantially non-clogging by reason of the permissible large size thereof due to the exceptionally large area of the plunger.

DANIEL W. McNEIL.